(12) United States Patent
Elliot

(10) Patent No.: US 6,497,275 B1
(45) Date of Patent: Dec. 24, 2002

(54) INSTALLATION FOR HEATING AND/OR VENTILATING THE PASSENGER COMPARTMENT OF A VEHICLE EMPLOYING SELECTIVE EXTRACTION OF AIR

(75) Inventor: Gilles Elliot, Courcouronnes (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/427,922

(22) Filed: Oct. 27, 1999

(30) Foreign Application Priority Data

Oct. 27, 1998 (FR) .............................. 98 13443

(51) Int. Cl.[7] .............................. B60H 1/00; B60H 1/26
(52) U.S. Cl. ..................... 165/204; 165/202; 165/42; 454/70; 454/75; 454/144
(58) Field of Search ..................... 165/42, 43, 203, 165/204, 202, 41; 454/75, 70, 76, 144, 161; 237/5

(56) References Cited

U.S. PATENT DOCUMENTS

| | | | | |
|---|---|---|---|---|
| 3,329,078 A | * | 7/1967 | De Coye De Castelet | 454/160 |
| 4,219,071 A | * | 8/1980 | Careglio et al. | 165/42 X |
| 4,989,499 A | * | 2/1991 | Scoccia et al. | |
| 4,991,405 A | * | 2/1991 | Sakano | 454/161 X |
| 5,261,855 A | | 11/1993 | Law et al. | |
| 5,595,239 A | * | 1/1997 | Wolf et al. | 165/41 |
| 5,647,793 A | * | 7/1997 | Mariaux et al. | 454/70 |
| 5,733,190 A | * | 3/1998 | Wahab | 454/76 X |
| 5,735,338 A | * | 4/1998 | Chevroulet et al. | 165/42 |
| 5,779,536 A | * | 7/1998 | McCorkel et al. | |
| 6,062,975 A | * | 5/2000 | Knudtson | |
| 6,186,886 B1 | * | 2/2001 | Farrington et al. | 454/75 X |
| 6,277,023 B1 | * | 8/2001 | Schwarz | |
| 6,332,330 B1 | * | 12/2001 | Loup et al. | 165/42 X |

FOREIGN PATENT DOCUMENTS

| | | | | |
|---|---|---|---|---|
| DE | 25 08 955 A1 | * | 9/1976 | 454/144 |
| JP | 6-143975 | * | 5/1994 | 237/5 |

OTHER PUBLICATIONS

Patent Abstracts of Japan, vol. 010, No. 122 (M–476), May 7, 1986 & JP 60 252020 A (Nippon Denso KK), Dec. 12, 1985.
French Search Report dated Jul. 12, 1999.

* cited by examiner

*Primary Examiner*—Ljiljana Ciric
(74) *Attorney, Agent, or Firm*—Morgan & Finnegan, LLP

(57) ABSTRACT

A fan causes a flow of cold air and warm air into the internal space of the passenger compartment of a vehicle. Air extraction channels connected to corresponding extraction vents are distributed at different locations in the passenger compartment. Controllable flaps selectively apportion and control the distribution of the extracted airflow between the different extraction channels.

15 Claims, 1 Drawing Sheet

INSTALLATION FOR HEATING AND/OR VENTILATING THE PASSENGER COMPARTMENT OF A VEHICLE EMPLOYING SELECTIVE EXTRACTION OF AIR

FIELD OF THE INVENTION

The present invention relates generally to the field of heating/ventilating the passenger compartment of vehicles.

BACKGROUND OF THE INVENTION

Vehicle heating/ventilating devices comprise, in a conventional manner, means for providing a flow of cold, or chilled, air and warm air mixed in controllable proportions and introduced into the passenger compartment of a vehicle.

The incoming flow of air is distributed in the passenger compartment by a plurality of air distribution channels, the channels connected to various air diffusion louvres or inlets located at different positions, in particular near the feet, at mid-height and in the dashboard near the windscreen.

The airflow is forced into the passenger compartment by the speed of the vehicle and/or by means of a motor driven fan or "pulser" which produces an overpressure in the passenger compartment with respect to the pressure of the external environment.

Because of this overpressure, the air in the passenger compartment is evacuated towards the rear of the vehicle by means of vents called "extractors", usually located at the rear of the vehicle, in order to enable an even sweeping of the passenger compartment by the circulating flow of air.

However, this conventional configuration, even though allowing a satisfactory renewal of the air in the passenger compartment space, does not always result in optimal comfort or good control of air circulation because of the complex geometry of the passenger compartment i.e., dead are poorly swept by the flow of air and due to the screening effect caused by the seats).

Moreover, this configuration does not take into account differing needs for example, the requirement to optimize defrosting, to provide more passenger comfort, to increase the ventilation for some passengers and to reduce it for others, etc.

In addition, in particular from U.S. Pat. No. 5,261,855, a smoke removal device is known which makes it possible to draw off tobacco smoke before it mixes with the air contained in the passenger compartment. However, this device does not make it possible to favor the distribution and circulation of air in the passenger compartment.

OBJECTS OF THE INVENTION

The present invention aims to overcome these various difficulties by proposing an installation for heating and/or ventilating the passenger compartment of an vehicle simultaneously allowing:

a better control of the airflow, making possible control of the pathway of air between its entry into and exit from the passenger compartment, optimization of comfort in each zone, with the possibility of selective regulation of the airflow in each of the zones of the compartment (driver, front passenger, rear passengers, windscreen), and an increase in heat exchange and ventilation capacity: the airflow being limited to the zone where it is needed, losses are less and the size of the pulser can therefore be reduced, with a correlated reduction in cost, volume and noise level.

SUMMARY OF THE INVENTION

According to the present invention there is provided an installation for heating and/or ventilating the passenger compartment of a vehicle, comprising means for producing flows of cold, or chilled, air and of warm air, and a plurality of air distribution channels connected to a plurality of air diffusion inlets, with at least one air extractor designed to put the internal space of the passenger compartment in connection with the ambient outside air and to remove air from the passenger compartment as a result of the pressure difference between the compartment interior and the compartment exterior, and further comprising a plurality of air extraction channels connected to corresponding extraction vents distributed at different locations in the passenger compartment, and an apportioning means for selective control of the distribution of the extracted airflow between the various extraction channels to increase the distribution and circulation of air in at least one zone of the passenger compartment.

Thus embodiments of the present invention prevent some zones of the passenger compartment being little or poorly ventilated.

The apportioning means make it possible to selectively distribute the extracted airflow between the different extraction channels.

The apportioning means may advantageously comprise means for closing in a controlled and selective manner at least some of the extraction vents.

The extraction vents may, in particular, be located near the floor of the vehicle, or integrated into a seat of the vehicle, in particular in the upper part of the latter, or may be located at the top of the windscreen of the vehicle.

Preferably, the air extraction channels are connected to forced extraction means.

BRIEF DESCRIPTION OF THE DRAWINGS

A preferred embodiment of the invention will now be described, with reference to the single attached FIGURE which shows diagrammatically, in longitudinal cross-section, the passenger compartment of a vehicle.

DESCRIPTION OF A PREFERRED EMBODIMENT

Figure 1:
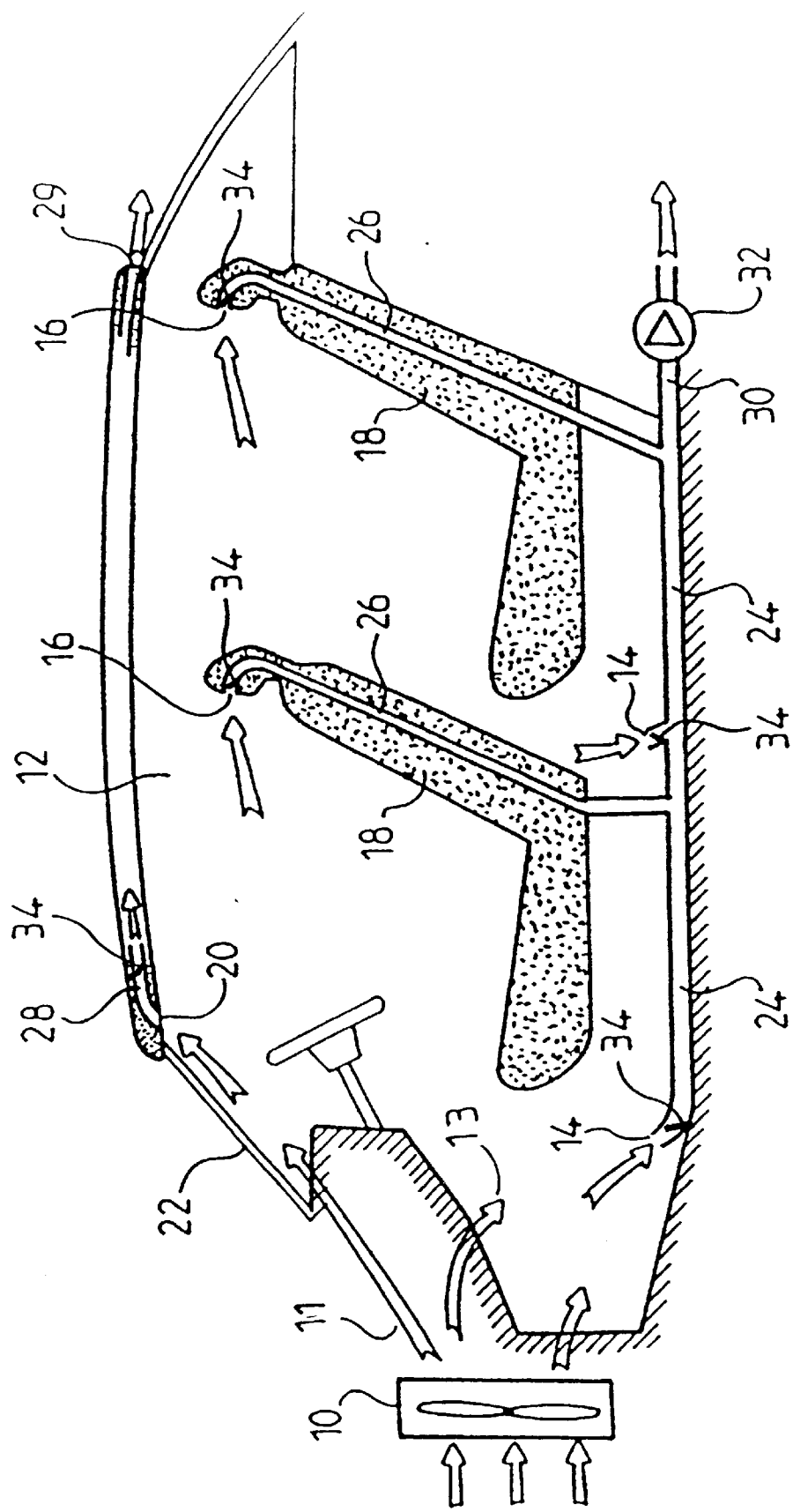

The vehicle comprises a block 10 for production of cold, or chilled, air and warm air, with a pulser making it possible to force the air under pressure into the passenger compartment 12 of the vehicle through a plurality of air distribution channels which are connected to various air diffusion inlets.

As an alternative to or in addition to air extractors incorporated in the floor at the rear of the vehicle, a plurality of air extraction vents are provided, distributed at different locations in the passenger compartment in order to evacuate the air introduced under pressure by the pulser into the interior of the passenger compartment.

Thus extraction vents 14 may be provided located near the floor of the vehicle.

Other extraction vents 16 may be situated near the seats 18, or even incorporated into the seats, preferably at the height of the passenger's heads, for example by incorporating the said extraction vents in the headrest of the seats 18.

It is likewise very advantageous to provide one or more extraction vents 20 located at the top of the windscreen 22 of the vehicle, for example extraction vents may be integrated in the roof of the vehicle.

These extraction vents 14, 16 and 20 are connected to air extraction channels 24, 26 and 28, respectively, opening either on the exterior of the passenger compartment through an opening 29, or into a common collecting channel 30 which leads outside the passenger compartment. Preferably, extraction means 32 are provided on the collecting channel 30 making it possible to force the air extraction in the channels 24, 26 and 28 and thus the extraction of air out of the passenger compartment through the extraction vents 14, 16 and 20.

Very advantageously, the extraction vents/extractors can be adjusted and/or closed depending on passenger needs, for example, by providing an apportioning means 34 for controlling the opening of the various extraction vents, which may take the form of vent flaps or valves in the various extraction channels. It will be possible in this way to modulate and control the flows of air in the passenger compartment depending on passenger requirements. Thus, if it is desired to give priority to defrosting, it will be possible to occlude, totally or partially, the extraction vents 14 and 16 and to open the roof vent to the maximum so as to optimize circulation of hot air against the windscreen 22 and to avoid detachment of air from the windscreen during defrosting mode.

Conversely, if it is desired to give preference to the isolation of one of the passengers, for example, a passenger who is smoking, it would be possible to fully open the extraction vents 16 incorporated in the seat corresponding to the passenger so as to concentrate the extraction, and thus the air circulation, in the zone around the passenger, more particularly in the upper region of the zone.

The extraction vents/extractors may equally be controllable and occludable in relation to a zone of the passenger compartment. Each zone corresponds to the immediate surroundings of the driver or of a passenger. Thus, comfort zones are created for each vehicle occupant and it is possible to ventilate or not ventilate a zone of the passenger compartment.

The apportioning means for opening the extraction vents/extractors may be manual or automatic, and provided, for example, by equipping the extraction vents with motor driven flaps.

Conversely, if it is desired to give preference to the isolation of one of the passengers, for example a passenger who is smoking, it would be possible to fully open the extraction vents 16 incorporated in the seat corresponding to the passenger so as to concentrate the extraction, and thus the air circulation, in the zone around the said passenger, more particularly in the upper region of the said zone.

The extractors may equally be controllable and occludable in relation to a zone of the passenger compartment. Each zone corresponds to the immediate surroundings of the driver or of a passenger. Thus, comfort loops are created for each passenger and it is possible to ventilate or not ventilate a zone of the passenger compartment.

The said controls for opening the extractors may be manual or automatic, provided, for example, by vents equipped with motor driven flaps.

In the latter case it may be advantageous to centralise the control of the different extraction vents by coupling them together, which makes it possible to provide the operator with an automatic control depending on various predetermined programmes.

What is claimed is:

1. An installation for heating and/or ventilating a passenger compartment of a vehicle, the passenger compartment defining an internal space and an external space, the installation comprising means for producing flows of chilled air and warm air, at least one air distribution channel connected to said means for producing flows, at least one air diffusion inlet connected to said at least one air distribution channel and providing air flow to the internal space, wherein said means for producing flows is operative to increase pressure in the internal space, a vehicle seat, a vehicle windscreen having a top and a bottom, a plurality of air extraction channels in flow communication with the external space, a plurality of extraction vents in communication with the internal space, each extraction vent connected to at least one of said plurality of air extraction channels whereby the internal space is placed in flow communication with the external space, said extraction vents operative to remove air from the passenger compartment as a result of a pressure difference between the internal space and the external space, each of said plurality of extraction vents located in the passenger compartment and defining a passenger comfort zone, wherein at least one of said plurality of extraction vents is integrated into the vehicle seat and at least one of said plurality of extraction vents is proximate the top of the windscreen, and apportioning means for selectively controlling distribution of extracted airflow between different extraction vents and for increasing distribution and circulation of air in at least one of the passenger comfort zones.

2. The installation of claim 1 wherein the apportioning means comprise means for closing, in a controlled and selective manner, at least one of said plurality of extraction vents.

3. The installation of claim 1 further including secondary extraction vents located near the floor of the passenger compartment.

4. The installation of claim 1 wherein the vehicle seat has an upper portion and a lower portion, and wherein at least one of said extraction vents is located in the upper portion of the vehicle seat.

5. The installation of claim 1 further including
   a means for forced extraction of air connected to at least one of said plurality of extraction vents.

6. A vehicle including an installation for heating and/or ventilating a passenger compartment of the vehicle, the passenger compartment defining an internal space and an external space, installation comprising means for producing flows of air;

at least one air distribution channel connected to said means for producing flows;

at least one air diffusion inlet connected to said at least one air distribution channel and providing air flow to the internal space, wherein said means for producing flows is operative to increase pressure in the internal space;

a vehicle seat;

a vehicle windscreen having a top and a bottom;

a plurality of air extraction channels in flow communication with the external space;

a plurality of extraction vents in communication with the internal space, each extraction vent connected to at least one of said plurality of air extraction channels whereby the internal space is placed in flow communication with the external space, said extraction vents operative to remove air from the passenger compartment as a result of a pressure difference between the internal space and the external space, each of said plurality of extraction vents located in the passenger compartment and defining a passenger comfort zone, wherein at least one of said plurality of extraction vents is integrated into the vehicle seat and at least one of said plurality of extraction vents is proximate the top of the windscreen; and apportioning means for selectively controlling distribution of extracted airflow between different extraction vents and for increasing distribution and circulation of air in at least one of the passenger comfort zones.

7. An installation for heating and/or ventilating the passenger compartment of a vehicle, the passenger compartment defining an interior and an exterior, the vehicle having a windscreen, said installation comprising;

a vehicle seat in the interior of the passenger compartment;

an air flow generator;

an air distribution system connected to said air flow generator, said air distribution system providing an air flow that has been generated to the interior of the passenger compartment, wherein said air flow generator is operative to increase pressure in the interior; and an air extraction system connecting the interior and the exterior of the passenger compartment, said air extraction system including a plurality of air extraction vents located in the passenger compartment, at least one of said plurality of air extraction vents positioned in the vehicle seat at the top of the vehicle seat and at least one of said plurality of air extraction vents disposed proximate the windscreen, and at least one air extraction channel in communication with the exterior and connected to at least one of said plurality of air extraction vents, said plurality of air extraction vents defining one or more passenger comfort zones proximate the vehicle seat or the windscreen, said air extraction system operative to remove air from the passenger comfort zone in the passenger compartment due to a pressure difference between the interior and the exterior of the passenger compartment.

8. The installation of claim 7 wherein said air distribution system further comprises:

an air distribution channel connected to said air flow generator; and an air diffusion inlet connecting said air distribution channel to the interior.

9. The installation of claim 7 wherein said air extraction system further comprises:

a valve for selectively controlling the flow of air in said air extraction system in order to control the distribution and circulation of air in at least one passenger comfort zone of the passenger compartment.

10. The installation of claim 7 wherein said air extraction system further comprises:

a fan for forced extraction of air.

11. The installation of claim 7 wherein said air flow generator further comprises a means for cooling said air flow.

12. The installation of claim 7 wherein said air flow generator further comprises a means for heating said air flow.

13. An heating/ventilating system for a vehicle, the vehicle having a windscreen and also having a passenger compartment defining an internal space and an external space, The heating/ventilating system comprising:

a pulser, the pulser operative to produce an airflow;

a distribution channel connected to the pulser;

a diffusion inlet connected to the distribution channel the diffusion inlet providing the airflow to the internal space, wherein the pulser is operative to increase pressure in the internal space;

a seat disposed in the passenger compartment;

a plurality of extraction vents, the diffusion inlet and the extraction vent cooperatively establishing a passenger comfort zone, at least one of the plurality of extraction vents disposed in the seat and at least one of the plurality of extraction vents disposed near the top of the windscreen;

an extraction channel, connected to the extraction vent, the extraction vent and extraction channel placing the internal space in communication with the external space and operative to remove air from the passenger comfort zone as a result of a pressure difference between the internal space and the external space; and apportioning means for selectively controlling the distribution of extracted airflow via the plurality of extraction vents and for increasing the distribution and circulation of air in the passenger comfort zone.

14. The heating/ventilating system of claim 13 wherein the apportioning means is a valve or a flap located in the extraction channel.

15. The heating/ventilating system of claim 13 further including a floor extraction vent located near the floor of the passenger compartment.

* * * * *